J. I. RICHARDS.
VEHICLE WHEEL TIRE.
APPLICATION FILED NOV. 17, 1914.
1,160,323.
Patented Nov. 16, 1915.
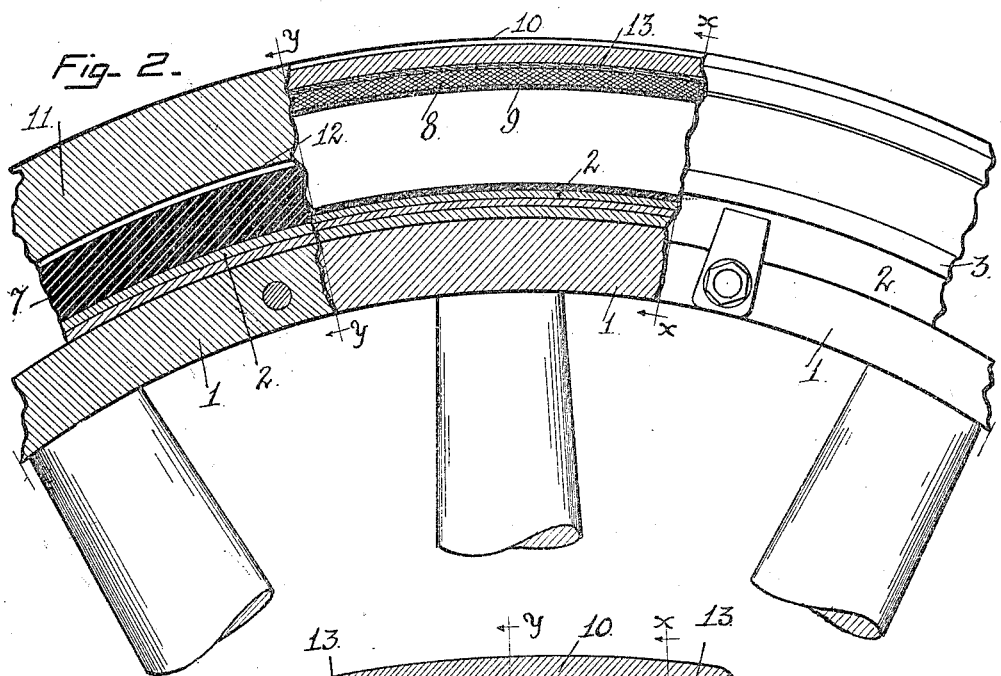
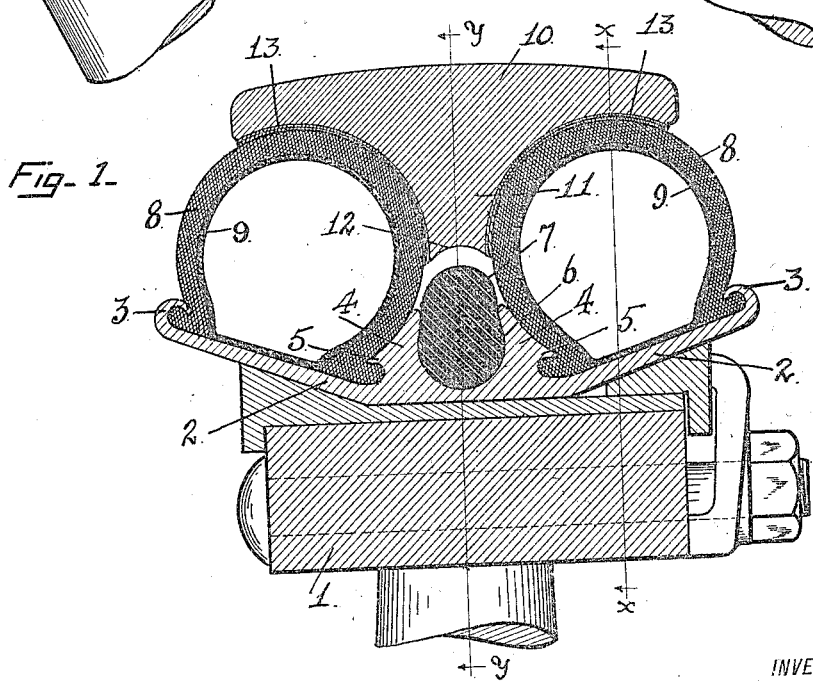
WITNESSES:
Wm. F. Drew.
S. Cristine.
INVENTOR
Joseph I. Richards
BY Wm. F. Booth
ATTORNEY

UNITED STATES PATENT OFFICE.

JOSEPH I. RICHARDS, OF SAN FRANCISCO, CALIFORNIA.

VEHICLE WHEEL-TIRE.

1,160,323.  Specification of Letters Patent. Patented Nov. 16, 1915.

Application filed November 17, 1914. Serial No. 872,557.

*To all whom it may concern:*

Be it known that I, JOSEPH I. RICHARDS, a citizen of the United States, residing at the city and county of San Francisco and State of California, have invented certain new and useful Improvements in Vehicle Wheel-Tires, of which the following is a specification.

My invention relates to the general class of vehicle-wheel tires and particularly to those of the pneumatic type.

The object of my invention is to provide a simple, durable, inexpensive and practical non-puncturable and non-skidding pneumatic tire; and to this end my invention consists in the novel tire which I shall now describe by reference to the accompanying drawings, in which—

Figure 1 is a cross section of my tire. Fig. 2 is a side view, reduced, of an arc or section of the tire, broken away, to show it at different depths, on the lines $x$—$x$ and $y$—$y$.

1 is the wheel-felly and 2 is the rim, here shown as of the demountable type. The rim 2 is fashioned or provided on each side with a fastening for the tire-casing, which fastening may be of any approved type. For illustration, I here show it as a clencher 3. The rim 2 is further provided or formed with a median circumferential ridge 4, which, at each side, is formed with a clencher 5, and in its middle with a seat 6 for a circumferential cushion 7, preferably of rubber. The rim 2 has thus two pairs of opposing clenchers forming a pair of side by side casing seats. In these are fitted the tire-casings 8, each casing containing an inner tube 9, adapted to be inflated, in the usual manner, thus providing a pair of pneumatic members.

10 is the tire-tread, the back portion 11 of said tread member being shaped to conform to and to fit in the inter-casing space. The base of said back portion is concaved at 12 to conform to the cushion 7. Between the tread member and the tire casings is a layer or layers of fabric 13, to serve as a grip or an anti-creep member for adjacent surfaces.

It will be noted that the rim seats for the tire casings are tilted or inclined downward toward each other so that the two casings lean inwardly toward each other. This results in a vise-like grip on the tread member under the inflation pressure of the casings, so that no other fastening is needed to hold the tread member in place. Any tendency to a rotary or creeping movement of the tread member is avoided by the friction due to the intervention of the fabric 13, the rough surfaces of which are sufficient for this purpose, especially if, as is best in practice, the adjacent surface of the tread member itself be roughened.

The tread member 10 may be of any suitable durable and non-puncturable material adapted for such use, such, for example, as pressed fiber. I do not, however, confine myself to this material, as other materials, may be used, metallic or otherwise. The tread, in extent, covers the danger exposed area of the two casings, so that the latter are protected from wear, and from puncture or cuts, or like injuries, though yielding their full pneumatic effect. The tread by thus covering a pair of casings, is necessarily relatively wide and this may be taken advantage of to make it relatively flat, that is, on a curve of long radius. This is of value in rendering it less liable to slip or skid. The casings and inner tubes being in pairs, may be relatively small ones. Consequently, motorcycle and even bicycle tires are available for automobiles. Herein lies one of the principal advantages of my invention, namely, marked economy in first cost.

When the pneumatic members of the tire are inflated, the base 12 of the back portion of the tread 10 is held away from contact with the cushion 7. But when, by leakage, the tires become partially deflated, the tread then rests its base upon the cushion 7, thereby saving the casings from injury. The tread member is readily fitted to place, and both pneumatic tubes being inflated simultaneously to the same pressure, an equal grip is imposed upon the back portion of said tread. The tread is easily renewable, and if it be damaged and no other tread be immediately available, it may be removed and the vehicle may run temporarily on the casings or on either of them, or in case they, too, be out of commission, it may run on the cushion 7. The tread may have any suitable surface, smooth or rough.

I claim:—

1. A vehicle wheel tire comprising a pair of independent pneumatic members seated on a double rim, said double rim having a central connecting part formed to provide securing shoulders for the inside edges of the tires, and being continued outwardly to accord with the contour of the inflated portion of the tire to constitute outwardly extending seats therefor.

2. A vehicle wheel tire comprising a pair of independent pneumatic members seated on the wheel rim side by side, an independent tread member covering the danger exposed area of the pneumatic members, said tread member having a back portion lying between and clamped by the pneumatic members when inflated, said wheel rim having a centrally connected part formed to provide securing shoulders for the inside edges of the tires, and being continued outwardly to accord with the contour of the inflated portion of the tires to constitute outwardly extending seats therefor, and an independent cushion member mounted between said securing shoulders on the wheel rim and in the plane of the back portion of the tread member, said back portion being normally separated from the cushion but adapted to ride thereon when the pneumatic members are partially deflated.

In testimony whereof I have signed my name to this specification in the presence of two subscribing witnesses.

JOSEPH I. RICHARDS.

Witnesses:
  WM. F. BOOTH,
  D. B. RICHARDS.